T. RIGBY.
METHOD OF WORKING AMMONIA RECOVERY PRODUCER GAS PLANTS.
APPLICATION FILED MAY 13, 1911.
1,141,829.
Patented June 1, 1915.
2 SHEETS—SHEET 2.
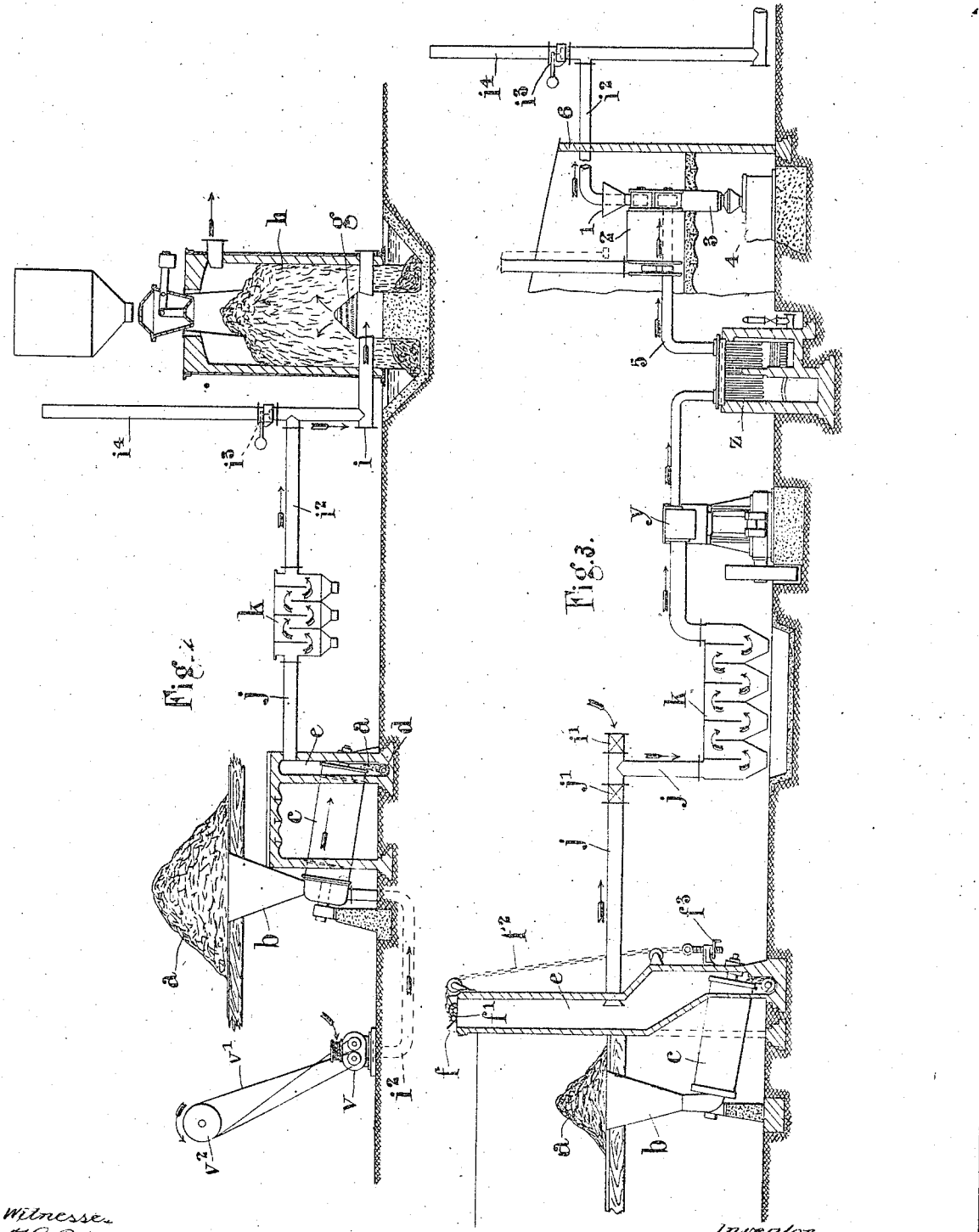

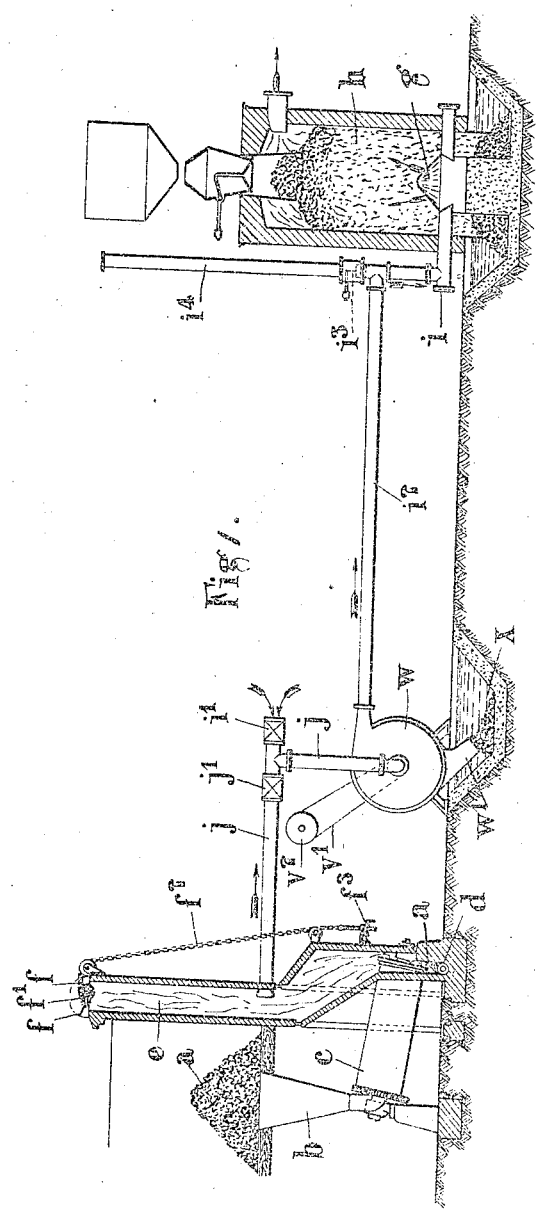

UNITED STATES PATENT OFFICE.

THOMAS RIGBY, OF DUMFRIES, SCOTLAND, ASSIGNOR TO WETCARBONIZING LIMITED, OF LONDON, ENGLAND.

METHOD OF WORKING AMMONIA-RECOVERY PRODUCER-GAS PLANTS.

1,141,829.　　　Specification of Letters Patent.　　Patented June 1, 1915.

Application filed May 13, 1911. Serial No. 626,955.

*To all whom it may concern:*

Be it known that I, THOMAS RIGBY, a subject of the King of Great Britain and Ireland, and residing at Station Hotel, Dumfries, Scotland, have invented certain new and useful Improvements in Method of Working Ammonia-Recovery Producer-Gas Plants, of which the following is a specification.

The invention has for its object to greatly reduce the cost of production of briquet fuel made from brown coal peat lignite or the like.

In ammonia recovery producer gas plants large quantities of water-vapor or steam are required for the purpose of keeping down the temperature of combustion in the gas producers with the object of making large quantities of ammonia from the original nitrogen in the fuel and conserving it after it is made and passes away in the producer gas until it is finally recovered in the later stages of the process. As a rule, a large portion of this vapor has to be raised from auxiliary sources, with a consequent expense in fuel, but, if the gas is to be used for the purposes of a briqueting plant, considerable economies may be effected in the manner hereinafter described. In briqueting plants for treating brown coal or peat, whether air dried or wet carbonized, provision is usually made for evaporating the moisture from the fuel. For instance when using brown coal in such a plant the fuel often contains fifty to sixty per cent. of moisture by weight in its composition and the same conditions usually prevail when using peat in a similar plant. In this invention I propose to utilize all or a portion of this vapor in an ammonia recovery gas plant worked in conjunction with a fuel briqueting plant by mixing the vapor with air compressing the mixture, and passing it under pressure into the air supply of the gas producers to replace wholly or partially the auxiliary steam usually employed for this purpose.

In the accompanying drawings are illustrated three arrangements of an ammonia recovery producer gas plant combined with a peat or the like fuel briqueting plant for carrying my present invention into effect.

Figures 1 and 2 are diagrammatic, partly sectional, elevations of combined ammonia recovery gas producing and fuel briqueting plants. Fig. 3 is also a diagrammatic elevation partly sectional, having in the connections between the combined plants a dust extractor after the peat drier, a compressor, and independently fired steam superheater, and a peat superheater in advance of the gas producer.

In the arrangement illustrated by Fig. 1, the disintegrated and pulverized peat or like fuel $a$ is fed into a hopper $b$ through which it is fed in the usual way to a rotary drying cylinder $c$, of the Schultz type or of any other suitable known type, and delivered at the other end where it is removed by a screw conveyer $d$ or other suitable appliance and delivered where required.

The vapor, generated from the peat or the like by the process of drying in the cylinder $c$, passes upward through the chimney $e$. At the top of the chimney shaft $e$—I mount a pair of flap valves $f$, which are geared together at $f'$ and operated by a chain $f^2$ from a hand wheel $f^3$ in order to control the amount of vapor, if any, allowed to escape into the atmosphere.

In the arrangement illustrated by Fig. 1 I make a direct connection between the chimney shaft $e$ and the air supply to the producer, and arrange the regulation in such a manner that only the quantity of vapor actually required is taken from the chimney shaft, the remainder being allowed to escape as heretofore into the atmosphere through the flap valves, $f$. This is effected by connecting a pipe $j$ provided with valve controlled air inlets $i'$ to the chimney shaft $e$ and to a pressure-raising device which is designed in such a manner that any dust present in the air or vapor is thrown out by centrifugal action. The type of pressure raising apparatus I propose to use with this method is a blower or fan $w$, driven by a belt $v'$ from a pulley $v^2$, or in other convenient manner, and which forces the air and vapor mixture from the drier $c$ of the fuel briqueting plant through the pipe $i^2$ into the air supply pipe $i$ of the gas producer $h$. The fan $w$ by centrifugal action throws out the dust present in the air and vapor mixture and discharges it through a pipe $w'$ into a lute $x$, from which it can be recovered and returned to the system for the purpose of briquet making.

In the form last described, only a single pressure raising device has been shown as employed to raise the pressure of the air and vapor mixture from the fuel briqueting plant to the degree required before it is passed into the gas producer system and it will be understood that these arrangements are shown as examples only.

There is in most cases a surplus of vapor produced and in some cases I allow the surplus to escape through the valves $f$ and only pass through the pressure raising device and centrifugal dust extractor $w$ the actual vapor required for the gas producers. I prefer however usually to pass the whole of the vapor produced from the driers through the combined pressure raising device and centrifugal dust extractor $w$ as by this means the whole of the dust is recovered in the process, and if there is an excess of vapor I provide a relief valve or outlet valve $i^3$ and discharge pipe $i^4$ on the delivery side of the pressure raising device for the purpose of allowing the excess vapor to escape into the atmosphere freed from objectionable dust. In such cases the top of the chimney is closed by the valves $f$ the whole of the vapor being taken through the combined pressure raising device and centrifugal dust extractor $w$.

Another system, under which I may work in some cases, is that illustrated in Fig. 2, in which I pass the air or a portion of it only (on its way to the gas producers) under pressure through the drier of the fuel briqueting plant, the vapor being carried away with the air under pressure to wherever it is required. In the apparatus illustrated, I show the blower $v$ forcing air through the pipe $i^2$ into the drier $c$, whence the vapor is discharged into the chamber $e'$ corresponding to the chimney shaft $e$ in the previous arrangement, and conducted by the pipe $j$ through the dust extracting device $k$ and through the pipe $i^2$ to the air supply pipe $i$ of the gas producer $h$. It is vital that in an arrangement of this kind the dust extracting device, which may be of any suitable kind, be placed between the outlet of the drier and the inlet of the gas producer system, as a larger quantity of dust is carried over with the vapor under a pressure than when working the drier at or about atmospheric pressure.

When the briqueting plant is constructed to treat wet carbonized peat in the manner described in the British specification to Patent No. 12010 of 1909 it may be advisable to utilize the vapor produced from the driers for this purpose. I illustrate such an arrangement diagrammatically in Fig. 3. I take the vapor with a greater or less proportion of air content, as desired, this being effected by regulating the valves $f$, $j'$ and $i''$ to the extent required, and I superheat the air and vapor mixture, and preferably compress it either before or after superheating before passing it to the peat heating or superheating device to enable the operations according to the aforesaid patented process to be performed. The said patented operations consist essentially in first drying the carbonized substance so that only a small percentage of free moisture remains in it and then subjecting it at a temperature of one hundred and twenty degrees centigrade or higher to pressure in an open die briqueting press.

As will be seen in Fig. 3 the air and vapor mixture after leaving the dust separator $k$ passes through the air compressor $y$ and then through an independently fired superheater $z$ whence the superheated vapor mixture passes to the peat superheater of the briqueting plant in which the peat is fed into a hopper 1 and passes to the peat superheater 2 whence it is delivered in a highly heated state through the pipe 3 direct to the briqueting press 4, the end of which only is shown.

From the drawings it will be seen that the air and vapor mixture after having been superheated in the superheater $z$ passes through the pipe 5 into the peat superheater 2, the temperature of which it assists in maintaining, and passes thence through the pipe 6 to the air inlet pipe $i$ of the gas producer system as before described.

I find it desirable in practice in most cases that the quantity of air passing through the tubes in contact with the peat in the driers shall be such that the vapor leaving the chimney is at a temperature in the neighborhood of eighty five degrees centigrade. The air is thus saturated with vapor at the same temperature and a proportion of air to vapor is obtained which is advantageous to the working of ammonia recovery gas producers. I may however pass any desirable proportion of air through the driers to obtain any suitable temperature of saturation.

When the material to be gasified or to be dried in Schultz driers contains 55% of water (as is very common when working with peat or lignite) there is evaporated when making 4 tons of briquets per hour approximately 4.7 tons of water-vapor per hour. If this is passed mixed with air saturated say at 85° C. there is sufficient vapor to supply the ammonia producer plant with all it requires without adding steam in the best case, in others it is necessary to supply additional steam if the same degree of saturation is used as more fuel has to be gasified for the purpose of maximum ammonia recovery. I may in such cases pass all the air required for the gas producers through the driers with the result that it would leave saturated at a lower degree than that above indicated the auxiliary steam being added prior to its entrance to the gas producers. The saturation may not however in any case be less than corresponding to 75° C. and in such a case auxiliary steam has to be added before entering the gas producers, when working with fuel containing 55% of water. Obviously a lower or higher saturation of the air supplied to the gas producers may be used when working with fuels containing higher or lower percentages of water in their composition, this being varied with the object of obtaining at all times maximum yield of ammonia.

If I wish to raise some auxiliary steam by water or liquor regeneration from the gas producers as is well known with the ammonium recovery type of plant it is desirable to use the air intended for gasification for this purpose. In such cases I cause the saturation of the mixture leaving the driers to be higher even so high as 98° or 99° C. the mixture of air and water vapor (principally water vapor) thus passed being preferably delivered under pressure into the air main between the regenerating apparatus and the gas producers.

The result of mixing the highly saturated mixture from the driers with saturated air from the regenerative apparatus at a temperature of approximately 70° C. is, that the final mixture of air and steam entering the gas producers is in the neighborhood of 85° C. or whatever saturation is considered desirable for obtaining maximum yields of ammonia.

Having now described my invention what I claim as new and desire to secure by Letters Patent is:—

The method of utilizing the vapors generated in the driers of a briqueting plant consisting in mixing them with air in suitable proportion, compressing the mixture, extracting suspended matters and passing the mixture at the desired pressure to a gas producer system; substantially as and for the purposes described.

In testimony whereof I have signed my name to this specification in the presence of two subscribing witnesses.

THOMAS RIGBY.

Witnesses:
E. C. WALKER,
P. A. OUTHWAITE.